Jan. 31, 1967  L. H. COOK  3,301,897
PROCESS FOR UREA SYNTHESIS
Filed Nov. 8, 1965
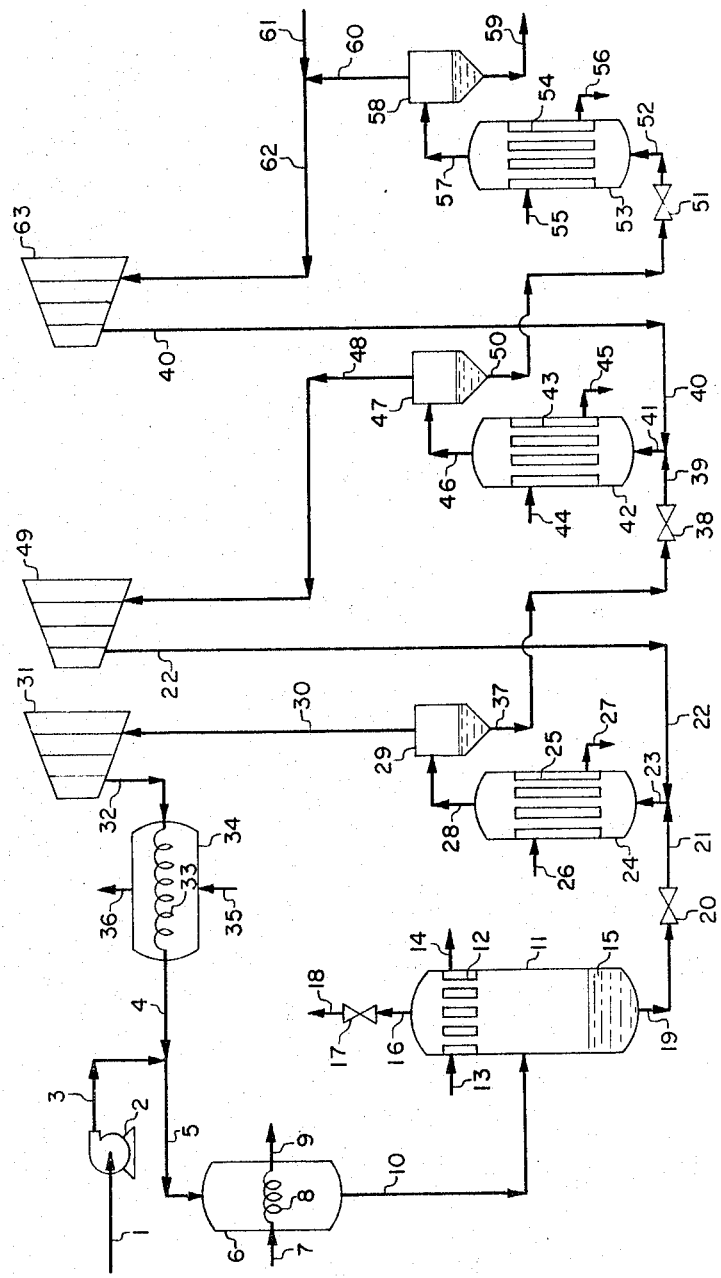
LUCIEN H. COOK
INVENTOR.
BY  J T Cha Coty
AGENT

United States Patent Office 3,301,897
Patented Jan. 31, 1967

3,301,897
PROCESS FOR UREA SYNTHESIS
Lucien H. Cook, Port Washington, N.Y., assignor to Chemical Construction Corporation, New York, N.Y., a corporation of Delaware
Filed Nov. 8, 1965, Ser. No. 506,752
10 Claims. (Cl. 260—555)

The present invention relates to the synthesis of urea, by the reaction between ammonia and carbon dioxide at elevated temperature and pressure. An improved complete off-gas recycle processing sequence is provided, in which the mixed off-gas generated from the main process stream at a lower pressure level is adiabatically compressed to the next higher pressure level and is thereby heated to a highly elevated temperature. The resulting hot off-gas is mixed with the liquid process stream at the next higher pressure level, and thereby heats the liquid process stream with concomitant decomposition of ammonium carbamate. The presence of the hot off-gas in contact with the liquid process stream also aids in the separation of further off-gas from the liquid phase during a subsequent indirect heating stage in which the liquid process stream is heated by heat exchange with a hot fluid such as steam. In addition, the resultant cooling of the recycling off-gas stream provides improved efficiency in the subsequent further compression of the off-gas prior to recycle to the urea synthesis reactor.

The synthesis of urea is commercially attained by the reaction between ammonia and carbon dioxide at elevated temperature and pressure. In most installations a complete recycle or total conversion process is desired, and consequently unreacted process components are recycled to the synthesis autoclave or reactor for further conversion. In this case, the process stream to the reactor will contain feed streams of ammonia and carbon dioxide, together with recycled process components. The initial reaction between ammonia and carbon dioxide results in the formation of ammonium carbamate. The formation of ammonium carbamate takes place very rapidly, and the reaction goes essentially to completion. The subsequent dehydration of ammonium carbamate to yield urea is an equilibrium reaction, and total conversion to urea is not attained in practice. Thus, the effluent stream from the synthesis reactor contains urea, ammonium carbamate, water, and excess free ammonia. Excess ammonia is usually provided to produce higher equilibrium conversion to urea, by a dehydration effect.

The reactor effluent stream is usually heated in a plurality of stages at successively reduced pressure, in order to decompose ammonium carbamate and generate a mixed off-gas containing ammonia, carbon dioxide and water vapor at each stage. The unconverted process components in the off-gas must be recycled to urea synthesis, in order to provide a complete recycle process with total conversion of reactants. Numerous procedures have been developed or proposed for the recycle of unconverted process components in urea synthesis. Thus, it has been proposed to recycle these components to the urea synthesis reactor as an aqueous ammonia-ammonium carbamate solution or slurry. Another process is based on the use of hydrocarbon oil as the slurrying agent for ammonium carbamate. Other procedures involve the separation of the mixed off-gas into separate ammonia and carbon dioxide streams, as by scrubbing the off-gas with a selective solvent such as monoethanolamine, followed by individual recycle of the separated ammonia and carbon dioxide as two separate streams.

It has also been proposed in the prior art to recycle the mixed off-gas as a hot gas stream, which is compressed at elevated temperature. In such a procedure, it is necessary to maintain the gas stream above the temperature level at which solid or liquid ammonium carbamate is condensed, in order to prevent excessive wear on the compressor due to abrasion or corrosion. This basic process sequence is described in U.S. Patent No. 1,429,483. In addition, a discussion of a commercial application of the process in Germany is given in Fiat Final Report No. 889, also published as P. B. Report No. 47,773. A recent improvement on the basic process, in which the hot recycling off-gases are compressed at highly elevated temperature in substantially adiabatic compression means, is disclosed in U.S. Patent No. 3,200,148. Further improvements relative to adiabatic or substantially adiabatic compression of the recycling off-gases are described in U.S. patent application No. 246,747, filed December 25, 1962, now U.S. Patent No. 3,232,985, issued February 11, 1966, and U.S. patent application No. 491,675, filed September 30, 1965.

In the present invention, an improved processing sequence involving the substantially adiabatic compression of the mixed off-gas stream prior to recycle is provided. As discussed supra, the urea synthesis reactor effluent is usually heated in a plurality of stages at successively reduced pressure, in order to decompose ammonium carbamate and generate a mixed off-gas at each stage. In the process of the present invention, the mixed off-gas generated from the main process stream at a lower pressure level is compressed to the next higher pressure level in substantially adiabatic compression means, and is thereby heated to a highly elevated temperature. The resulting hot off-gas stream is mixed with the liquid process stream at the next higher pressure level, and thereby heats the liquid process stream with concomitant decomposition of ammonium carbamate and evolution of further off-gas at this higher pressure level. The resultant off-gas is then separated from the liquid phase and is further compressed, prior to eventual recycle to urea synthesis.

The procedure of the present invention provides several important advantages. Due to the direct contact mixing of the hot compressed off-gas with the liquid process stream at the higher pressure level, a portion of the heat content of the off-gas is usefully employed in further ammonium carbamate decomposition. In addition, this portion of the heat content of the off-gas is utilized in a highly efficient manner due to direct contact mixing, as compared to indirect heat exchange or heat transfer by the provision of an intermediary heat transfer agent. As mentioned supra, the presence of the hot off-gas in contact with the liquid process stream also aids in the evolution and separation of further off-gas from the liquid phase during a subsequent indirect heating stage, in which the liquid process stream is heated by heat exchange with a hot fluid such as steam, by providing turbulence in the liquid phase. Finally, the resultant cooling of the recycling off-gas stream is advantageous in providing improved efficiency in the subsequent further compression of the off-gas prior to recycle to the urea synthesis reactor, because the gas stream is cooler.

It is an object of the present invention to provide an improved urea synthesis process.

Another object is to provide an improved complete recycle urea synthesis process, in which the off-gas streams derived from ammonium carbamate decomposition are compressed and directly recycled to urea synthesis.

A further object is to decompose ammonium carbamate in the urea synthesis effluent stream and generate an off-gas in an improved manner.

An additional object is to efficiently utilize the hot off-gas produced by compression of off-gas from a lower pressure level in substantially adiabatic compression means for decomposition of ammonium carbamate in the urea synthesis effluent stream at a higher pressure level.

Still another object is to usefully and efficiently cool the hot recycling off-gas stream between stages of substantially adiabatic compression in a complete recycle urea synthesis process.

These and other objects and advantages of the present invention will become evident from the description which follows. Referring to the figure, which is a flowsheet of a preferred embodiment of the present invention, ammonia feed stream 1, which will usually consist of liquid ammonia, is passed into pump 2 and is compressed to urea synthesis pressure, typically in the range of 140 to 420 kg./sq. cm. The resulting compressed ammonia feed stream 3 is added to compressed liquid or partially gaseous process stream 4 containing ammonia, carbon dioxide and water vapor. As will appear infra, stream 4 consists of the total process off-gas derived from ammonium carbamate decomposition, preferably combined with a gaseous carbon dioxide feed stream.

The mixed process stream 5 derived from the combination of streams 3 and 4 is now passed into urea synthesis reactor or autoclave 6, and is reacted at an elevated temperature typically in the range of 150° C. to 250° C. and elevated pressure typically in the aforementioned range of 140 to 420 kg./sq. cm., in order to form ammonium carbamate by the initial reaction between ammonia and carbon dioxide, and to dehydrate a portion of the ammonium carbamate to yield urea. The process stream in reactor 6 is usually cooled during the reaction, preferably by heat exchange with liquid water which is vaporized to produce usable process steam. Thus, the liquid water stream 7 is passed into coil 8 within reactor 6, and is vaporized to produce steam stream 9.

The synthesis effluent stream 10 derived from reactor 6 contains urea, ammonium carbamate, excess free ammonia and water, and will usually also contain a small proportion of inerts such as nitrogen. In order to prevent a possible buildup of inerts concentration in the complete off-gas recycle sequence, the effluent stream 19 is preferably passed into retention vessel 11 which is maintained with an internal pressure substantially equal to the autogenous pressure of stream 10. Vessel 11 is provided with an upper heat exchange section 12, through which a coolant is passed via streams 13 and 14. The coolant 13 will preferably consist of liquid ammonia which is at least partially vaporized in section 12, in which case stream 14 will consist of ammonia vapor. The rising gas phase within vessel 11 passes upwards through heat exchange section 12, and the ammonia, carbon dioxide and water vapor components of the gas phase are condensed to liquid which passes downwards in vessel 11 and combines with the main liquid process stream 15 in the lower part of vessel 11. Thus, the inerts gas component of stream 10 is removed from the upper part of vessel 11 via stream 16 and is substantially free of process components. Inerts stream 16 passes through pressure control valve 17 and is discharged to atmosphere via stream 18.

The resulting liquid process stream 19, now substantially free of inerts, is withdrawn from vessel 11 and passed through pressure reducing valve 20. The resulting process stream 21, now at a reduced pressure typically in the range of 50 to 110 kg./sq. cm. and a temperature usually in the range of 50° C. to 250° C., is mixed with hot recycle off-gas stream 22, which is derived from a lower pressure stage as described infra and which will typically be at a temperature in the range of 300° C. to 550° C. Thus, stream 22 serves to heat stream 21 and promotes decomposition of ammonium carbamate in the combined process stream 23, as described supra. Stream 23 passes into heat exchanger 24 provided with internal tubes 25, which are externally heated by hot fluid stream 26. Stream 26 will preferably consist of steam, in which case the resultant cooled fluid stream 27 will consist of condensate water. The heating of stream 23 in tubes 25 produces further decomposition of ammonium carbamate and generation of off-gas consisting of ammonia and carbon dioxide, together with vaporized water. As mentioned supra, the presence of recycle gaseous stream 22 within the tubes 25 serves to promote the evolution of off-gas and separation of off-gas from the liquid phase. The resultant mixed gas-liquid stream 28 discharged from unit 24 is passed into gas-liquid separator 29, which is a baffled or cyclonic means of conventional design for separation of the gas phase from the liquid phase. The resulting combined off-gas stream 30 removed from separator 29 contains ammonia, carbon dioxide and water vapor components derived from stream 22, as well as similar components derived from the decomposition of ammonium carbamate and vaporization of water from stream 21.

Stream 30 is now recycled to urea synthesis. Thus, stream 30 is passed into gas compressor 31, which will preferably consist of substantially adiabatic compression means as described in U.S. Patent No. 3,200,148, and the gas stream is compressed in unit 30 to elevated urea synthesis pressure and a highly elevated temperature, typically in the range of 300° C. to 550° C. The resultant hot gas stream 32 discharged from unit 31 is passed through coil 33 in heat exchanger 34, and is cooled to a suitable temperature for subsequent urea synthesis. Partial or total condensation of the gas stream to the liquid phase may occur due to the cooling in coil 33. The recycle process stream 4 discharged from coil 33 is processed as described supra, for further urea synthesis. A heat exchange fluid stream 35 is passed into unit 34, and serves to cool the coil 33. The resultant heated fluid is discharged from unit 34 as stream 36. In most instances, stream 35 will consist of liquid water and stream 36 will consist of usable process steam.

Returning now to separator 29, the residual liquid phase derived from stream 28 is removed as stream 37, which is passed through pressure reducing valve 38. The resulting process stream 39, now at a reduced pressure typically in the range of 10 to 40 kg./sq. cm. and a temperature usually in the range of 50° C. to 250° C., is mixed with hot recycle off-gas stream 40, which is derived from the lowest pressure stage as described infra and which will typically be at a temperature in the range of 300° C. to 550° C. Thus, stream 40 serves to heat stream 39 and promotes decomposition of ammonium carbamate in the combined process stream 41, as described supra. Stream 41 passes into heat exchanger 42, which is similar to unit 24 described supra. Thus, unit 42 is provided with internal tubes 43, which are externally heated by hot fluid stream 44. Stream 44 will preferably consist of steam, in which case the resultant cooled fluid stream 45 will consist of condensate water. The heating of stream 41 in tubes 43 produces further decomposition of ammonium carbamate and generation of off-gas consisting of ammonia and carbon dioxide, together with vaporized water. As mentioned supra, the presence of recycle gaseous stream 40 within the tubes 43 serves to promote the evolution of off-gas and separation of off-gas from the liquid phase. The resultant mixed gas-liquid stream 46 discharged from unit 42 is passed into gas-liquid separator 47, which is a unit similar in configuration and function to unit 29 described supra. The resulting combined off-gas stream 48 removed from separator 47 contains ammonia, carbon dioxide and water vapor components derived from stream 40, as well as similar components derived from the decomposition of ammonium carbamate and vaporization of water from stream 39.

Stream 48 is now compressed to an elevated pressure typically in the range of 50 to 110 kg./sq. cm. in substantially adiabatic gas compressor 49, which consists of compression means as described in U.S. Patent No. 3,200,148. The gas stream is thus heated to a highly elevated temperature, typically in the range of 300° C. to 550° C., and is discharged from unit 49 and recycled as stream 22.

Returning now to separator 47, the residual liquid phase derived from stream 46 is removed as stream 50, which is passed through pressure reducing valve 51. The resulting process stream 52, now at a reduced pressure typically in the range of 0.35 to 3.5 kg./sq. cm. and a temperature usually in the range of 50° C. to 250° C., is passed into heat exchanger 53, which is similar to unit 24 described supra. Thus, unit 53 is provided with internal tubes 54, which are externally heated by hot fluid stream 55. Stream 55 will preferably consist of steam, in which case the resultant cooled fluid stream 56 will consist of condensate water. The heating of stream 52 in tubes 54 produces final decomposition of ammonium carbamate and generation of off-gas consisting of ammonia and carbon dioxide, together with vaporized water. The resultant mixed gas-liquid stream 57 discharged from unit 53 is passed into gas-liquid separator 58, which is a unit similar in configuration and function to unit 29 described supra. The residual liquid phase derived from stream 57 is removed from unit 58 as stream 59, which consists of product aqueous urea solution substantially free of ammonia and carbon dioxide. Stream 59 is now passed to product utilization, such as evaporative concentration to produce solid crystal urea or concentration followed by prilling to produce solid urea prills.

Returning now to separator 58, a low pressure off-gas stream 60 is removed and contains ammonia, carbon dioxide and water vapor components derived from stream 57. Stream 60 is now preferably combined with carbon dioxide feed stream 61, in accordance with U.S. patent application No. 491,675 mentioned supra. The resulting combined gaseous stream 62 is compressed to an elevated pressure typically in the range of 10 to 40 kg./sq. cm. in substantially adiabatic gas compressor 63, which consists of compression means as described in U.S. Patent No. 3,200,148. The gas stream is thus heated to a highly elevated temperature, typically in the range of 300° C. to 550° C., and is discharged from unit 63 and recycled as stream 40.

Numerous alternatives within the scope of the present invention will occur to those skilled in the art. Thus, the range of process variables such as temperature and pressure enumerated supra constitute merely preferably ranges of these variables for optimum utilization of the process concepts of the present invention, and thus it will be evident that the process is operable under process conditions of temperature and pressure other than those enumerated supra. The process concept of the present invention is applicable to any urea synthesis process in which ammonium carbamate decomposition is carried out in a plurality of stages at successively reduced pressure, although optimum efficiency is attained in most instances when the ammonium carbamate decomposition and off-gas generation is carried out in three or more stages at successively reduced pressure, since in this manner compression power requirements are reduced due to conservation of pressure levels of off-gas.

The inert gas purger 11 may be of an alternative configuration similar to unit 71 described in U.S. patent application No. 246,747, now U.S. Patent No. 3,232,985, mentioned supra. Other alternative arrangements or means for removal of inert gas from the system, such as periodically purging a portion of the recycling off-gas or the process disclosed in U.S. Patent No. 2,214,068, will occur to those skilled in the art. The process concept of U.S. Patent No. 3,172,911 may be utilized in conjunction with the present invention. In this case, the process streams 21 or 39 will be initially passed to an auxiliary gas-liquid separator similar to unit 29, to separately remove the gaseous phase generated by adiabatic flash expansion to the lower pressure level. This gaseous phase will then be added to the respective off-gas stream 30 or 48 for recycle to urea synthesis, and the residual liquid phase will be mixed with hot recycling off-gas stream 22 or 40 in accordance with the present invention.

In some cases greater efficiency in off-gas compression and recycle may be attained by initially reducing the pressure of stream 19 to an intermediate pressure above that of stream 21, and separating an initial off-gas generated by adiabatic flash expansion. The pressure level of the residual liquid phase would then be further reduced to produce stream 21. In this case, stream 32 would be produced at a pressure level equal to that of the initial off-gas, and the two gas streams would be combined and further compressed to urea synthesis pressure and passed to coil 33. As an alternative, stream 32 could be produced at urea synthesis pressure and the initial off-gas could also be separately compressed to urea synthesis pressure and combined with stream 32, and the combined gas stream would then be passed to coil 33.

In order to provide accurate temperature control, in some cases it will be desirable to divide stream 22 into two portions, one of which is mixed with stream 21 as described supra, with the other portion being directly added to stream 30 for further compression. Similar considerations apply with respect to stream 40, thus in practice stream 40 may be divided into two portions, one of which is mixed with stream 39 as described supra, with the other portion being directly added to stream 48 for further compression.

An alternative arrangement for obtaining the heat recovery and off-gas cooling benefits of the present invention, while reducing the size of the ammonium carbamate decomposers due to reduced gas loading, could be carried out in practice. This alternative modification of the present invention consists of injecting, sparging, or otherwise mixing the hot recycling off-gas stream 22 into the body of liquid in separator 29, in order to attain gas-liquid mixing and equilibrium in unit 29, instead of mixing stream 22 with stream 21 as described supra. In this case, stream 23 would be identical with stream 21, and the volume, composition, temperature and pressure of stream 30 would be essentially the same as described supra. Similar considerations apply with respect to stream 40, which would alternatively be injected, sparged, or otherwise mixed into the body of liquid in separator 47, instead of being mixed with stream 39.

Depending on the relative proportions of streams 3 and 32, unit 34 may be omitted and stream 32 may alternatively be directly recycled as stream 4 without prior cooling, since the addition of liquid ammonia stream 3 to the gaseous process stream provides a cooling effect. However, in most instances it will be desirable to precool stream 32 in unit 34 prior to urea synthesis, in order to remove a portion of the heat of formation of ammonium carbamate and to attain an optimum urea synthesis temperature. The streams 9 and 36 consisting of usable process steam may be totally or partially employed as heating steam for ammonium carbamate decomposition, in which case streams 26, 44 and 55 would be derived from streams 9 or 36.

The gaseous carbon dioxide feed stream 61 will usually be derived from a process source in which carbon dioxide is produced at relatively low pressure, such as by-product carbon dioxide from the production of ammonia synthesis gas. In this case, the initially available carbon dioxide will be compressed in additional compressor means, prior to the addition to stream 60 as stream 61. Numerous other alternative points of addition of stream 61 to the process will occur to those skilled in the art. Thus, in some cases the gaseous carbon dioxide feed stream 61 may be available at an elevated temperature level. In this case, a portion or all of stream 61 may be added to liquid stream 52, to obtain advantageous results similar to the improved results of the present invention derived from the addition of hot gaseous streams 22 or 40 to the liquid streams 21 or 39 respectively.

In some instances the carbon dioxide feed stream 61 may be initially available at elevated pressure. In such circumstances, stream 61 may be added to streams 48 or 30. In other instances, stream 61 may be available at elevated pressure and high temperature, in which case stream 61 may be added to streams 40 or 22. Stream 61 may even be separately compressed to urea synthesis pressure and added directly to recycle stream 4, as described in U.S. Patent 3,200,148. In all such instances, where stream 61 is available at elevated pressure or is separately compressed prior to addition to the process, the low pressure recycle gas stream 62 will consist solely of off-gas stream 60 derived from decomposition of ammonium carbamate in stream 52. In such cases, in order to provide a sufficient volume of off-gas for efficient compression in unit 63, a higher pressure drop will be provided through valve 51, so as to attain more decomposition of ammonium carbamate at the lowest pressure level in unit 53, with concomitant generation of a greater volume of off-gas stream 60.

Numerous other alternatives within the scope of the present invention will occur to those skilled in the art. An example of an application of the process concept of the present invention to an industrial facility will now be described.

*Example*

The process concepts of the present invention were applied with respect to the design of a 1000 tons/day urea plant. The improvement in efficiency was shown with respect to the prior art sequence consisting of the direct mixing of stream 40 with the off-gas derived only from ammonium carbamate decomposition at the next higher pressure level, followed by further gas compression. This prior art sequence, which would essentially consist of adding stream 40 to stream 48, is designated as Case "A." The process sequence of the present invention, in which stream 40 is mixed with stream 39, is designated as Case "B." Following is a tabulation of pertinent operating conditions and energy requirements for both cases.

|  | Case A | Case B |
|---|---|---|
| Total Off-Gas Flow to Compressor 49, mols/hr | 1,937 | 1,937 |
| Off-Gas Inlet Temperature to Compressor 49, °C | 160 | 125 |
| Horsepower Required for Compressor 49, hp | 1,860 | 1,682 |
| Steam Required for Decomposer 42, million B.t.u./hr | 8.386 | 6.216 |

It is evident that the improved process sequence of Case B resulted in a power saving of 9.55% in the operation of compressor 49, as compared to Case A. In addition, Case B attained a steam saving of 14% in the operation of decomposer 42, as compared to Case A.

I claim:

1. In a urea synthesis process wherein feed streams of ammonia and carbon dioxide and a recycled process stream containing ammonia, carbon dioxide and water vapor are reacted at elevated temperature and pressure to synthesize urea, whereby a urea synthesis effluent stream containing urea, ammonium carbamate, excess ammonia and water is produced, ammonium carbamate in said effluent stream is decomposed in a plurality of stages at successively reduced pressure to generate a mixed off-gas stream at each stage containing ammonia, carbon dioxide and water vapor, the off-gas stream at each stage is separated from the residual liquid phase, whereby the residual liquid phase from the lowest pressure stage comprises product aqueous urea solution, and said off-gas streams are compressed to elevated pressure and recycled as said process stream, the improvement which comprises (a) compressing the off-gas stream from a lower pressure stage to the next higher pressure stage in substantially adiabatic compression means, whereby said off-gas stream is heated to a highly elevated temperature, (b) mixing the hot compressed off-gas stream from step (a) with the liquid process stream at the next higher pressure stage, whereby said off-gas stream heats said liquid process stream and thereby promotes decomposition of ammonium carbamate, (c) separating a combined off-gas stream, derived from components of the off-gas stream from step (a) together with components derived from decomposition of ammonium carbamate and vaporization of water from said liquid process stream, from the residual liquid process stream, and (d) further compressing the combined off-gas stream derived from step (c) to a higher pressure, prior to recycle of the total process off-gas as said recycled process stream.

2. The process of claim 1, in which said carbon dioxide feed stream is added to the off-gas stream derived from the lowest pressure stage, and the resulting combined gas stream is compressed and recycled as said lower pressure stage off-gas stream of step (a).

3. The process of claim 1, in which said liquid process stream of step (b) is further heated by indirect heat exchange with a hot fluid, whereby increased decomposition of ammonium carbamate at said next higher pressure level is attained.

4. The process of claim 3, in which said hot fluid is steam.

5. The process of claim 1, in which the off-gas stream of step (a) is heated to a temperature in the range of 300° C. to 550° C. by said off-gas compression, and the liquid process stream of step (b) is at an initial temperature in the range of 50° C. to 250° C. prior to mixing with said hot compressed off-gas stream.

6. The process of claim 1, in which the number of stages of successively reduced pressure in which ammonium carbamate in said effluent stream is decomposed is three, and the highest pressure stage is at a pressure in the range of 50 to 110 kg./sq. cm., the next lower pressure stage is at a pressure in the range of 10 to 40 kg./sq. cm., and the lowest pressure stage is at a pressure in the range of 0.35 to 3.5 kg./sq. cm.

7. In a urea synthesis process wherein feed streams of ammonia and carbon dioxide and a recycled process stream containing ammonia, carbon dioxide and water vapor are reacted at elevated temperature and pressure to synthesize urea, whereby a urea synthesis effluent stream containing urea, ammonium carbamate, excess ammonia and water is produced, said effluent stream is heated in a plurality of stages at successively reduced pressure by indirect heat exchange with a hot fluid to decompose ammonium carbamate and generate a mixed off-gas stream at each stage containing ammonia, carbon dioxide and water vapor, the off-gas stream at each stage is separated from the residual liquid phase, whereby the residual liquid phase from the lowest pressure stage comprises product aqueous urea solution, and said off-gas streams are compressed to elevated pressure and recycled as said process stream, the improvement which comprises (a) compressing the off-gas stream from a lower pressure stage to the next higher pressure stage in substantially adiabatic compression means, whereby said off-gas stream is heated to a highly elevated temperature, (b) mixing the hot compressed off-gas stream from step (a) with the liquid process stream at the next higher pressure stage and prior to said heating of the liquid process stream by indirect heat exchange with a hot fluid, whereby said off-gas stream heats said liquid process stream and thereby promotes decomposition of ammonium carbamate, (c) separating a combined off-gas stream, derived from components of the off-gas stream from step (a) together with components derived from decomposition of ammonium carbamate and vaporization of water from said liquid process stream, from the residual liquid process stream after said heating by indirect heat exchange with a hot fluid, and (d) further compressing the combined off-gas stream derived from step (c) to a higher pressure, prior to recycle of the total process off-gas as said recycled process stream.

8. The process of claim 7, in which said carbon dioxide feed stream is added to the off-gas stream derived from the lowest pressure stage, and the resulting combined gas stream is compressed and recycled as said lower pressure stage off-gas stream of step (a).

9. The process of claim 7, in which the off-gas stream of step (a) is heated to a temperature in the range of 300° C. to 550° C. by said off-gas compression, and the liquid process stream of step (b) is at an initial temperature in the range of 50° C. to 250° C. prior to mixing with said hot compressed off-gas stream.

10. The process of claim 7, in which the number of stages of successively reduced pressure in which ammonium carbamate in said effluent stream is decomposed is three, and the highest pressure stage is at a pressure in the range of 50 to 110 kg./sq. cm., the next lower pressure stage is at a pressure in the range of 10 to 40 kg./sq. cm., and the lowest pressure stage is at a pressure in the range of 0.35 to 3.5 kg./sq. cm.

No references cited.

ALEX MAZEL, *Primary Examiner.*

HENRY R. JILES, *Examiner.*